Mar. 13, 1923.
H. HORT.
BEARING FOR GYROSCOPES.
FILED MAR. 27, 1922.
1,448,404.
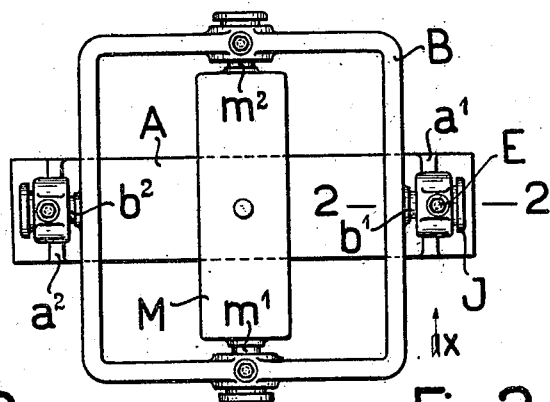
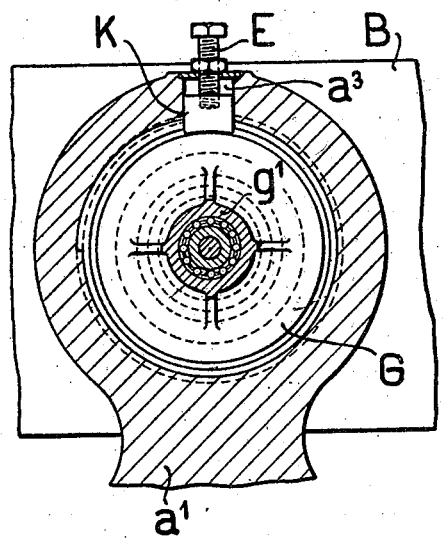
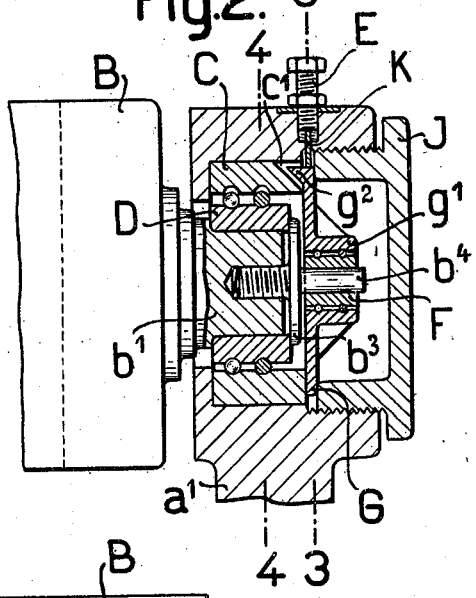
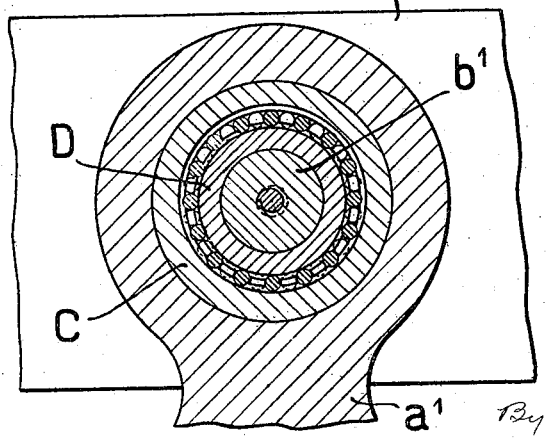
Inventor:
Hermann Hort.
By Patented Mar. 13, 1923.

1,448,404

UNITED STATES PATENT OFFICE.

HERMANN HORT, OF ESSEN, GERMANY, ASSIGNOR TO FRIED. KRUPP AKTIENGESELLSCHAFT, OF ESSEN-ON-THE-RUHR, GERMANY.

BEARING FOR GYROSCOPE.

Application filed March 27, 1922. Serial No. 547,330.

*To all whom it may concern:*

Be it known that I, HERMANN HORT, residing at Essen, Germany, a citizen of the German Republic, have invented a certain new and useful Improvement in Bearings for Gyroscopes, of which the following is a specification.

This invention relates to a bearing of a horizontal shaft designed for use in gyroscopes and comprising two bearings for each pivot of the shaft.

The invention has for its object to provide a bearing of this kind in which one of the bearings (main bearing) is mainly designed and adapted to take up the forces acting vertically with relation to the axis of the pivot, while the other bearing (auxiliary bearing) mainly serves to take up horizontal forces and forces acting transversely with relation to the pivot.

The accompanying drawing diagrammatically illustrates, by way of example, as an embodiment of the invention the universal mounting of the rotor (not shown) of a gyroscope having a vertical spinning axis and two horizontal Cardan shafts.

Fig. 1 is a plan view of the embodiment,

Fig. 2 is a section on the line 2—2 of Fig. 1, on an enlarged scale,

Figs. 3 and 4 are sections on the lines 3—3 and 4—4 respectively, of Fig. 2, seen from the right.

Referring now to the drawing in which similar characters of reference denote the same parts throughout, A is the base frame having two upwardly extending arms $a^1$ and $a^2$, and B is the outer gimbal ring of a universally suspended rotor (not shown). The gimbal ring B is swingingly mounted in the arms $a^1$, $a^2$ by means of two co-axial horizontal pivots $b^1$ and $b^2$ (Fig. 1) which are journalled each in a ball bearing. The inner gimbal ring M (Fig. 1) is swingingly mounted in the outer gimbal ring B by means of two horizontal pivots $m^1$ and $m^2$ in a manner exactly corresponding to the mounting of the ring B in the arms $a^1$ and $a^2$ by means of the pivots $b^1$ and $b^2$. The common axis of the pivots $m^1$ and $m^2$ vertically intersects the common axis of oscillation of the pivots $b^1$, $b^2$. Arranged in the gimbal ring M on a vertical spinning axis is a rotor (not shown) in such a manner that the spinning axis passes through the point of intersection of the axes of oscillation of the two gimbal rings M and B. The arrangement as a whole is such that the centres of gravity of the masses swinging on one of the Cardan shafts will coincide with the said point of intersection.

The pivots $b^1$, $b^2$, $m^1$ and $m^2$ are all of entirely the same construction and arrangement, so that it will be sufficient to describe the construction and mounting of the pivot $b^1$.

Mounted in a cylindrical bore of the arm $a^1$ is the outer race C (Figs. 2 and 4) of a double-rowed ball bearing which will hereinafter be referred to as main bearing. The inner race D of this bearing is slid on the pivot $b^1$. The number of balls of each ball-row of the main bearing is considerably larger and, consequently, the proportion of the diameter of each ball with relation to the diameter of the bearing much smaller than with ball bearings of ordinary construction. Besides, the balls of both rows are arranged in a ball cage (not shown) in such a manner that the balls of one row are staggered with relation to those of the other row by the width of half a ball. The inner race D is locked against axial shifting motion by an annular shoulder of the pivot $b^1$ at one side and by a flange $b^3$ at the other side. The flange $b^3$ is carried by a pin $b^4$ co-axially screwed into the pivot $b^1$, and it presses against the inner race D with such force that the latter is at the same time prevented from rotating with respect to the pivot $b^1$. Slid onto the pin $b^4$ is the inner race F of an auxiliary ball bearing which is also double-rowed and the balls of which are constructed and arranged in a manner similar to that of the main bearing. The outer race of the auxiliary ball bearing is formed by the hub $g^1$ of a disk G which bears against the front face of the outer race C of the main bearing, as is to be seen from Fig. 2. The disk G possesses a nose $g^2$ projecting into a notch $c^1$ of the race C, thereby locking the disk G against rotation with respect to the race C. An adjusting cap J screwed into the bore of the arm $a^1$ in the manner to be seen from Fig. 2, presses against the disk G with such force that this disk along with the outer race $g^1$ of the auxiliary bearing will be fixed with relation to the outer race C of the main bearing. The wall receiving the race C, is provided with a radial slot $a^3$ (Fig. 3) in which is mounted a rectangular slide K. The inner end face of the slide K bears against the circumferential surface of the disk G and is adapted to be pressed against the same by means of a lockable clamping screw E.

With a view of describing the operation of the present bearing arrangement, it is assumed that the outer gimbal ring B and the rotor-carrying inner gimbal ring M are mounted for oscillation in the main bearings of the pivots $b^1$, $b^2$ and $m^1$, $m^2$, but that the setting cap J and the clamping screw E as well as the corresponding setting caps and clamping screws belonging to the pivots $b^2$, $m^1$, $m^2$ are not yet tightened. Considering now the conditions for the pivot $b^1$, $b^4$, illustrated in Fig. 2, the following will be evident. The balls situated below the horizontal middle-plane of the main bearing will be pressed under the action of the pressure exerted by the pivot $b^1$, while the balls lying above the said plane will not be loaded. A state will thus be produced in which the balls lying above the said plane are separated from the race surrounding them by a small play (see Figs. 2 and 4 in which this play is shown on a considerably enlarged scale). The same state will also be produced in the main bearings of the pivots $b^2$, $m^1$ and $m^2$. As the setting cap J is not yet tightened, the disk G carrying the outer race $g^1$ of the auxiliary bearing will have freely adjusted itself owing to the elastic deformations occurring in the main bearing receiving the pivot $b^1$, so that the balls of the auxiliary bearing will not be loaded by vertical forces and therefore remain in the position to be seen from Figs. 2 and 3, according to which these balls uniformly bear against the circumference of the outer race $g^1$. In this position, the disk G carrying the outer race $g^1$ of the auxiliary bearing will be fixed with relation to the outer race C of the main bearing by screwing the setting cap J inwardly. Exactly the same manipulation will be made in adjusting the auxiliary bearings belonging to the pivots $b^2$, $m^1$ and $m^2$.

If the gyroscope is in use, for example on a rolling ship, and a horizontal force acting in or approximately in the direction of the arrow $x$, which for instance will occur at sudden accelerations of the base A, the largest part of this horizontal force will be transmitted through the intermediary of the auxiliary bearings which extend transversely to the direction of the force, while only a small part of the force will be transmitted by the main bearing. The reason herefor is based on the fact that, in the auxiliary bearings, the balls which are not submitted to the vertical forces, are uniformly enclosed on all sides by the outer races, while this is not the case with the main bearings which are loaded by vertical forces as stated before. Inasmuch as the balls of the auxiliary bearings are on all sides in uniform contact with the outer races, the transmission of forces will take place in the auxiliary bearings in a manner in which the resultant of the reacting forces will be directed radially and will not be able to cause an undesired turning moment acting on the gimbal ring B. Owing to the described arrangement of the auxiliary bearings relieved from vertical forces, the production of a turning moment acting around the axis of oscillation of a gimbal ring on the arising of a horizontal force, will be prevented as far as the largest part of the horizontal force transmitted by the auxiliary bearings is concerned. As to the smaller part of the horizontal force transmitted by the respective main bearings, this partial force will, indeed, produce an undesired turning moment acting around the axis of oscillation of the gimbal ring B, since the resultant of the reacting forces cannot be directed radially on account of the unequal load of the balls of the main bearing. However, this undesired turning moment and the undesired evasion of the spinning axis of the rotor will be much smaller than in case the said auxiliary bearings were not provided, so that under certain circumstances said turning moment need not be taken into consideration.

In case the turning moment which comes from the main bearings and which is already relatively small, should even be removed too, the clamping screws E will be tightened after the tightening of the setting cap J so that a vertical downwardly directed pressure will be exerted on the auxiliary bearings. The result of this pressure will be that the balls of the auxiliary bearings lying above the horizontal middle-plane will be pressed more heavily than those lying below that plane. Therefore, if a horizontal force will arise, the resultant of the reacting forces will no longer be directed radially also with the auxiliary bearings from the same reason as stated with relation to the main bearings, and the resultant force will accordingly produce a turning moment acting around the axis of oscillation of the gimbal ring B. However, as the balls under pressure lie above the horizontal middle-plane in the auxiliary bearing and below such plane in the main bearing, the last-mentioned turning moment will have a direction opposite to that produced by the corresponding main bearing and it may therefore be regulated by a suitable tightening of the clamping screw E in such a manner that the turning moment resultant of the two above-mentioned turning moments has the magnitude of zero.

As the main and auxiliary bearings are formed by double-rowed ball-bearings having particularly small and staggered balls, the object of the invention consisting in tending to prevent undesired evasions of the spinning axis of the rotor will be attained to a more perfect degree than by the use of ball bearings of ordinary construction. By the arrangement of particularly small balls staggered with relation to each other, it is attained that every acting force will be distributed to a very large number of balls and that deviations of the balls from a symmetrical position with relation to a horizontal or vertical middle-plane of the bearing can only become very small and, consequently, cannot unfavorably influence to a markable degree the direction of the resultant of the reacting forces, which direction—strictly taken—can only be radial if the parts are in a symmetrical position.

It will be evident that it will be within the spirit of the present invention to construct the main and auxiliary bearings as step— or as edge—bearings. Provision has only to be made then, that the adjustable auxiliary bearings designed to take up the horizontal forces are fitted to the corresponding pivot-parts no sooner than the main bearings are already loaded by all vertical forces that come into question.

In a universally suspended gyroscope having a horizontal spinning axis, it is necessary to construct the bearing of the rotor itself in one of the gimbal rings in the manner according to the subject-matter of the invention, and it is further necessary to mount also the gimbal ring swinging on a horizontal axis, in accordance with the invention. A gyroscope with a horizontal axis is thus obtained which, even upon accelerations of the body carrying it, will retain its adjusted direction with perfect accuracy.

Although it is without any importance to the invention, it is being remarked that all of the afore-mentioned embodiments of the invention are provided with ball thrust bearings (not shown) for the horizontal pivots, these bearings being designed to take up axial forces.

Claims.

1. A horizontal shaft bearing for gyroscopes, comprising two bearings for each pivot of the shaft, one bearing being designed and adapted to mainly take up vertical forces and the other bearing being designed and adapted to mainly take up horizontal forces and forces acting in a direction transverse with relation to the axis of the pivot.

2. A horizontal shaft bearing for gyroscopes, comprising a main and an auxiliary bearing for each shaft-pivot, the main bearing being designed and adapted to mainly take up vertical forces and the auxiliary bearing being adapted and designed to mainly take up horizontal forces and forces acting in a direction transverse with relation to the axis of the shaft pivot.

3. A horizontal shaft bearing for gyroscopes, comprising a main and an auxiliary bearing for each shaft-pivot, both bearings being ball bearings and arranged co-axially to and beside each other and including each two bearing members, one member of the auxiliary bearing being adjustable and lockable with relation to the stationary member of the main bearing.

4. A horizontal shaft bearing for gyroscopes, comprising a main and an auxiliary bearing for each shaft-pivot, both bearings being ball bearings and arranged co-axially to and beside each other and including each two bearing members, one member of the auxiliary bearing being adjustable and lockable with relation to the stationary member of the main bearing, and means being provided for exerting an additional force on the adjustable bearing member of the auxiliary bearing, whereby the balls being above a horizontal middle-plane are liable to be placed under pressure.

5. A horizontal shaft bearing for gyroscopes, comprising a main and an auxiliary bearing for each shaft-pivot, both bearings being ball bearings comprising each two rows of balls, the balls of each two rows being staggered with relation to each other and all of the balls having a particularly small diameter in comparison with the diameter of the bearing.

The foregoing specification signed at Essen, Germany, this 17th day of February, 1922.

HERMANN HORT.